(12) United States Patent
Sarlioglu et al.

(10) Patent No.: US 6,995,993 B2
(45) Date of Patent: Feb. 7, 2006

(54) RECTIFICATION SYSTEM FOR IMPROVING POWER QUALITY OF ELECTRICAL POWER SYSTEMS

(75) Inventors: Bulent Sarlioglu, Torrance, CA (US); Colin E. Huggett, Longmont, CO (US)

(73) Assignee: Honeywell International, Inc., Morristown, NJ (US)

( * ) Notice: Subject to any disclaimer, the term of this patent is extended or adjusted under 35 U.S.C. 154(b) by 218 days.

(21) Appl. No.: 10/683,388

(22) Filed: Oct. 14, 2003

(65) Prior Publication Data

US 2005/0077887 A1    Apr. 14, 2005

(51) Int. Cl.
*H02M 1/12* (2006.01)
(52) U.S. Cl. .................... 363/44; 323/215; 323/361
(58) Field of Classification Search ............. 323/215, 323/355, 361; 363/44, 64, 126
See application file for complete search history.

(56) References Cited

U.S. PATENT DOCUMENTS

| | | | |
|---|---|---|---|
| 4,013,942 A | 3/1977 | Boshnyaga et al. | |
| 4,876,634 A | 10/1989 | Paice | 363/5 |
| 5,124,904 A | 6/1992 | Paice | 363/3 |
| 5,148,357 A * | 9/1992 | Paice | 363/5 |
| 5,455,759 A | 10/1995 | Paice | 363/126 |
| 5,619,407 A | 4/1997 | Hammond | 363/155 |
| 5,703,421 A | 12/1997 | Durkin | 310/61 |
| 5,903,066 A | 5/1999 | Enjeti et al. | 307/105 |
| 5,977,761 A | 11/1999 | Bilger et al. | |
| 6,101,113 A | 8/2000 | Paice | 363/126 |
| 6,191,968 B1 | 2/2001 | Paice | 363/148 |
| 6,249,443 B1 * | 6/2001 | Zhou et al. | 363/5 |
| 6,335,872 B1 * | 1/2002 | Zhou et al. | 363/154 |
| 6,498,736 B1 | 12/2002 | Kamath | 363/44 |
| 6,525,951 B1 | 2/2003 | Paice | 363/154 |
| 6,861,936 B2 * | 3/2005 | Kamath | 336/148 |
| 2002/0186112 A1 | 12/2002 | Kamath | 336/5 |
| 2002/0190697 A1 | 12/2002 | Ferens et al. | 323/215 |

* cited by examiner

*Primary Examiner*—Jeffrey Sterrett
(74) *Attorney, Agent, or Firm*—Oral Caglar, Esq.

(57) ABSTRACT

A system and method for an autotransformer configuration including a plurality of windings which can be used to provide a substantial reduction in harmonics. The autotransformer includes a series of wye windings configured to provide a constant length voltage vector for any given input voltage, and a series of delta windings having a variable length voltage vector based upon turns ratio. The delta winding circuit is electrically coupled with the wye winding circuit to allow circulation of triplen harmonics, thereby reducing the effect on input current waveform such that total harmonic distortion (THD) is reduced, and producing an equivalent kVA rating that is lower than prior art applications, which results in savings in size, weight and cost.

20 Claims, 13 Drawing Sheets

RECTIFICATION SYSTEM FOR IMPROVING POWER QUALITY OF ELECTRICAL POWER SYSTEMS

FIELD OF THE INVENTION

The present invention relates to an autotransformer for a rectification system such as commonly found in aircraft electrical power systems in aerospace applications. Specifically, the invention relates to a system and method for providing an autotransformer including a harmonics eliminating winding circuit, such as an inner delta winding circuit that circulates and minimizes the effects of harmonics in the autotransformer input phase current waveform.

BACKGROUND OF THE INVENTION

Traditional commercial aircraft systems typically employ a constant frequency alternating current (ac) power distribution network in which various electrical motors may be coupled to an ac bus. Unfortunately, where such devices are directly coupled to the ac bus it is common to have a large inrush current present at equipment start up.

As commonly found in such a system, the variable speed of the main engine is converted into a constant frequency output via a mechanical interface device positioned between the main engine and various accessories, such as an ac electric generator or one or more auxiliary power units and lube pumps. A shaft running at a constant speed at the output of this mechanical device is used to rotate the accessories, including the main engine generator, thereby providing a constant frequency ac bus. However as advancements in aircraft system technologies become reality, it is contemplated that the constant frequency ac bus could be abandoned to allow the elimination of the mechanical interface between the main engine and the generator described above. Such advancements could further allow a system which would directly couple the ac electric generator to the main engine output shaft via a gearbox device.

The result of such direct coupling is an ac bus frequency value that would be proportional to the engine speed, and where the magnitude of the ac bus voltage would be regulated to a constant value via a generator control unit (GCU) for the generation system. The sizing of the accessory motors, such as those used for pump and fan applications for constant voltage-variable frequency systems, becomes significantly higher if each are directly connected to the constant voltage-variable frequency distribution system. Similarly, the inrush current requirements based upon these devices can also become substantial such as occurring in traditional commercial aircraft power systems.

For all these reasons, it is not feasible to directly couple these electrical machines directly to the constant voltage-variable frequency ac bus. However these machines can be connected to the bus via a rectification and inverter system such as a simple 6-pulse bridge rectifier. Unfortunately, due to the nonlinear nature of the operation of the 6-pulse rectification scheme, the input current drawn from the ac distribution system can become quite distorted. The frequencies at which characteristic harmonics are produced by such an input rectifier can be formulated as noted in equation (1) below.

$$f_H = (k \times q \pm 1) \times f_1 \qquad (1)$$

In equation (1), $f_H$=the characteristic harmonic, H=the number of harmonics, k=an integer beginning with 1, q=an integer representing the number of commutations per cycle, and $f_1$=the fundamental frequency.

The characteristic harmonics of a system such as a 6-pulse rectification system including $5^{th}$, $7^{th}$, $11^{th}$, $13^{th}$, $17^{th}$ and $19^{th}$ harmonics, can have considerable magnitudes. Therefore the total harmonics distortion (THD) of current can become quite high and in some applications, can exceed 40% of the fundamental current value. These harmonics are not desired in the distribution system for numerous reasons and can easily exceed the specification requirements. Such undesired harmonics can result in increased power losses and thereby require an increase of the kVA rating of both the generation and distribution systems. Additionally, the current harmonics can distort the voltage waveform at a point of regulation. For these reasons, manufacturers require substantial reduction in these harmonic current values.

Accordingly, a need exists for an autotransformer system and method that allows the connection of electrical machines to an ac bus while providing the required substantial reduction in the harmonic values described above.

SUMMARY OF THE PREFERRED EMBODIMENTS

An object of the present invention is to provide an autotransformer which can be used in any traditional three phase input ac-dc power conversion circuit, such as in a circuit between a constant voltage-variable frequency ac bus and a rectification and inverter system to provide a substantial reduction in harmonics created.

Another object of the present invention is to provide an autotransformer having an inner delta winding circuit electrically coupled with an outer wye winding circuit to circulate harmonics.

Still another object of the present invention is to provide an autotransformer having an inner delta winding circuit having variable voltage vector values.

Still another object of the present invention is to provide an autotransformer having an inner delta winding circuit configured to provide a substantial reduction in equivalent kVA rating.

Still another object of the present invention is to provide an autotransformer which can be configured to buck and/or boost the secondary voltages, and hence dc link voltage of the rectification system, while providing a substantial reduction in harmonics created.

These and other objects are substantially achieved by providing a system and method for an autotransformer including a plurality of windings and winding couplings configured to provide a series of output voltage vectors substantially 40 electrical degrees apart while also circulating harmonic currents within an inner delta winding circuit to reduce effects on input current waveforms. The system and method includes a series of wye windings that are configured to provide a constant length voltage vector for any given input voltage and a series of delta windings that are configured to provide a variable length voltage vector based upon winding turns ratios. The delta winding circuit is electrically coupled with the wye winding circuit to allow circulation of harmonic current values, including triplen harmonics, thereby reducing the effect on input current waveforms such that the total harmonic distortion (THD) value is reduced. The system and method results in an autotransformer requiring an equivalent kVA rating that is significantly lower than prior art applications, which further results in savings in size, weight and cost for the autotransformer which are at a premium in many applications, such as in aerospace applications.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The present invention described below includes an autotransformer circuit configured for use in a rectification circuit that minimizes harmonics up to and including the lower harmonics $5^{th}$, $7^{th}$, $11^{th}$ and $13^{th}$ of the input phase current waveform in an ac distribution system. The present invention includes an autotransformer having at least one inner delta winding circuit configured to circulate triplen harmonics and resulting in a reduced total harmonic distortion and an equivalent transformer kVA rating that is significantly lower than those of typical autotransformers found in similar circuits. This reduction in equivalent kVA results in savings in size, weight and costs associated with the autotransformer.

The autotransformer of the embodiment described below includes a plurality of windings configured to provide a series of output voltage vectors substantially 40 electrical degrees apart while circulating harmonic currents within an inner delta winding circuit to reduce harmonic effects on input current waveforms. The system and method includes a series of wye windings that are configured to provide a constant length voltage vector for any given input voltage, and a series of delta windings that are configured to provide a variable length voltage vector based upon the delta windings turns ratios. In the embodiment described below, the delta winding circuit is electrically coupled with the wye winding circuit to allow circulation of harmonic current values, including triplen harmonics, thereby reducing the effect on input current waveforms.

Figure 1:
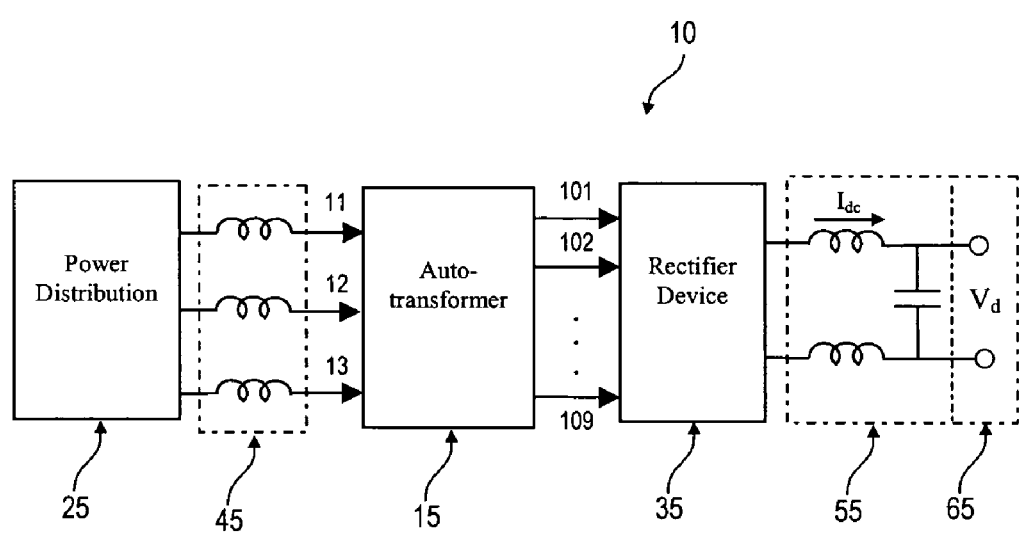
FIG. 1 is a block diagram illustrating an example of a rectification system for power quality incorporating an autotransformer in accordance with an embodiment of the present invention.

In FIG. 1, a block diagram is shown illustrating a rectification circuit in which a rectifier device such as an 18-pulse bridge rectifier, is used to provide a point at which various electrical machines can be coupled to a variable frequency multiphase ac bus via a power electronics inverter. In the block diagram 10 of FIG. 1, an autotransformer 15 is shown electrically coupled between a multiphase power distribution system 25 and a rectifier device 35. The power distribution system 25 can include for example, an ac electric generator coupled with a main engine output shaft thereby providing a constant voltage-variable frequency three phase system output. Coupled between the autotransformer 15 primary windings and the power distribution system 25, an additional three phase inductance and/or EMI filter 45 can be used to further adjust harmonics distortion of the current and help achieve EMI and power quality requirements.

To provide a dc power bus, a rectifier device 35 such as an 18-pulse bridge rectifier is electrically coupled to the autotransformer 15 secondary windings for providing a dc voltage to attached electrical equipment (not shown) at output terminals 65. As known to those skilled in the art, the rectifier device 35 can be constructed by connecting semiconductor devices in a multibridge configuration to provide a dc voltage output. When diodes are used for rectification in an 18-pulse bridge rectifier, there are 18 diodes each having an anode and cathode wherein nine diode pairs that are electrically coupled in series are further coupled in parallel as described in greater detail below.

Figure 2:
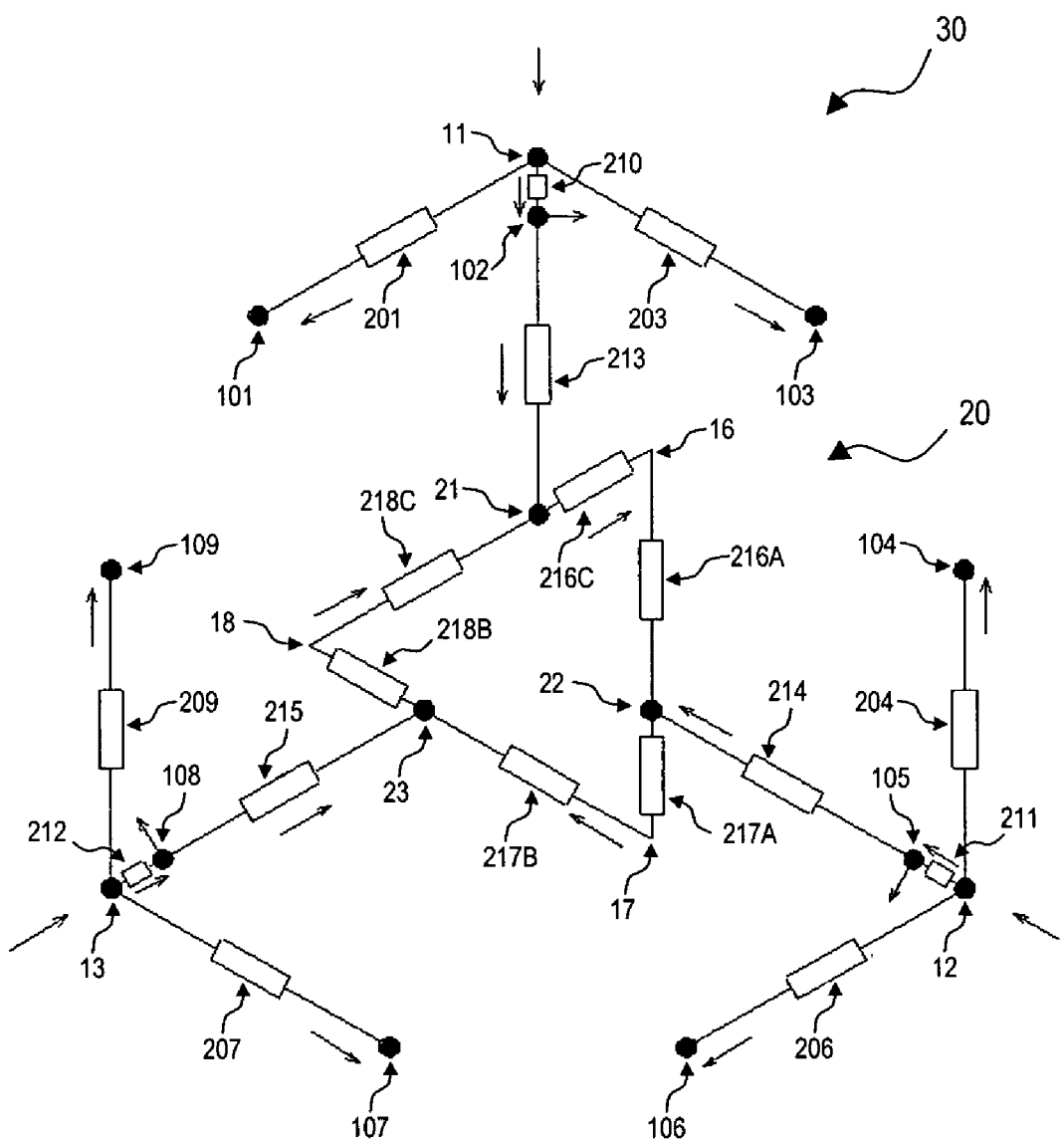
FIG. 2 is a vector-block diagram illustrating an example of a winding circuit configuration for an autotransformer applied in FIG. 1 and operating in accordance with an embodiment of the present invention.
Figure 4:
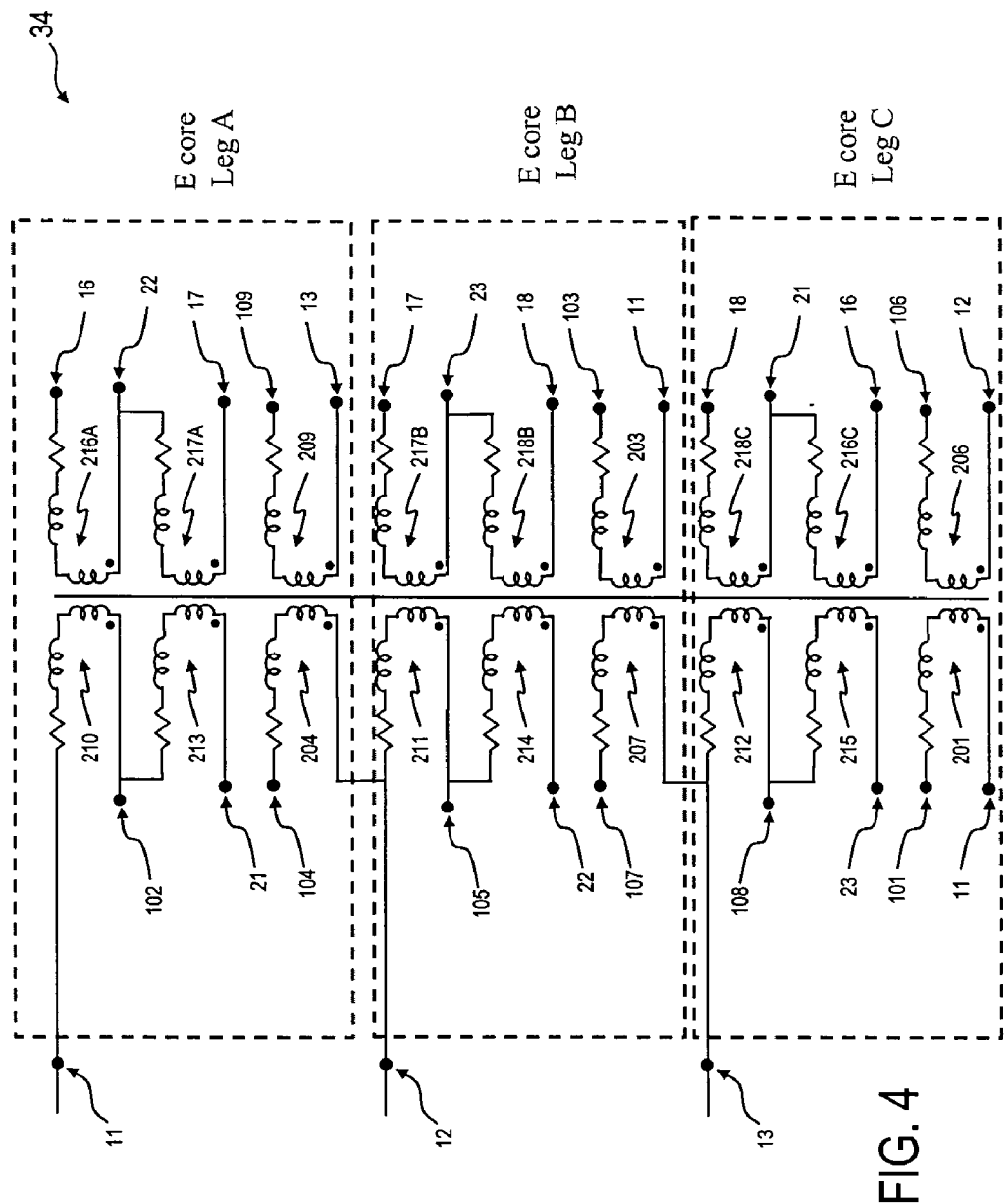
FIG. 4 is a schematic illustrating an example of a connection circuit for the winding circuit configuration of FIG. 2.

As shown in the implementation of FIG. 1, the autotransformer 15 is electrically coupled between the three-phase power distribution system 25 and the 18-pulse bridge rectifier 35 and can provide a series of output voltage vectors each substantially 40 electrical degrees apart in accordance with an embodiment of the present invention. As more clearly shown in FIGS. 2 and 4, these output voltage vectors result from a series of primary and secondary windings electrically coupled as described in greater detail below. FIG. 2 is a vector-block diagram illustrating an example of a winding circuit configuration for an autotransformer applied in FIG. 1. FIG. 4 is a schematic illustrating an example of a connection circuit for the winding circuit configuration of FIG. 2. Specifically, the electrical coupling of the primary and secondary windings establishes a series of associated output terminals 101 through 109 that can be further connected to the mid-point connection of each series connected diode of the rectifier device 35 as more clearly shown in FIG. 5. Returning to FIG. 1, any number of ac and/or dc filters 45 and 55 can also be provided to further adjust the harmonics distortion of the current and to help achieve EMI and power quality requirements.

Due to the nonlinear nature of the operation of a 6-pulse rectification scheme associated with the rectifier device, the input current drawn from the ac distribution system can become quite distorted, resulting in a total harmonics distortion (THD) of current being quite high. The term THD is used to express the distortion of a waveform as a percentage of the fundamental or pure sine wave of the voltage and current waveforms. This typically results from the addition of harmonic waveforms to the fundamental waveform.

For the embodiment and results described below, the THD value can be defined as shown in equation (2).

$$THD = 100 \times \frac{\sqrt{\sum_{h=2}^{\infty} I_h^2}}{I_1} \quad (2)$$

In equation (2), $I_1$ is the fundamental of the current, and h is the integer representing the harmonics other than the fundamental. In the embodiment of the present invention described below, the autotransformer 15 serves to minimize the characteristic harmonics, thereby reducing the THD and improving the equivalent kVA rating through the use of an inner delta winding circuit.

A vector-block diagram 30 illustrating an example of an autotransformer 15 configuration in accordance with an embodiment of the present invention is shown in FIG. 2. In the vector-block diagram 30, each primary and secondary winding and winding connection of the autotransformer 15 is shown wherein each winding is illustrated as a vector-block electrically coupled and scaled relative to remaining vector-blocks with respect to the turns ratio and corresponding to the voltage vector value for the individual winding. Diagram 30 illustrates the general scaled relationship of each voltage vector which are proportional to the turns ratio, however, an actual relationship between the turns ratio of each individual winding is more accurately determined based upon the voltage vector equations (3) through (9) described in greater detail below.

In FIG. 2, the vector-block diagram 30 of autotransformer 15 includes at least 6 windings per phase A, B and C, and an inner delta winding circuit 20, which is comprised in part of windings from each of phase A, B and C. The inner delta winding circuit 20 is provided to carry both triplen harmonics and a portion of fundamental current between phases A, B and C to reduce the harmonic current effect on input current waveforms as discussed in greater detail below.

As known to those skilled in the art, the autotransformer includes at least one primary and secondary side having associated primary and secondary taps, or electrical coupling points for connecting primary and secondary conductors. Within the autotransformer circuit, each tap is coupled to one another via one or more series of windings comprised of one or more electrical conductors of various gauges positioned, or wound about a core material. In contrast to a magnetically coupled transformer, an autotransformer lacks a separate magnetically coupled and electrically isolated secondary winding which is replaced by one or more secondary taps at a point along both primary and secondary windings that are sufficient to provide the required secondary voltage. This eliminates a large amount of construction materials hence reducing the size and weight of the autotransformer as well as providing better efficiency and greater regulation in the autotransformer as there is a reduced resistance and lower leakage reactance.

As illustrated by the vector-block diagram 30 shown in FIG. 2, the autotransformer 15 of the present invention includes at least eighteen quantitative winding vector-blocks and twelve taps. Although for purposes of discussion below winding segments are described and labeled separately, one or more windings can be provided as a continuous winding or winding conductor, and include one or more taps at a specific point along the winding which is capable of generating the desired secondary voltage-vector value. Additionally, as shown in FIG. 4, windings are grouped and positioned on each leg of a core comprised of an E-core leg A, E-core leg B and an E-core leg C. Each vector-block further includes the per unit voltage vector which is proportional to the turns ratio for the winding for which the vector-block represents.

Figure 5:
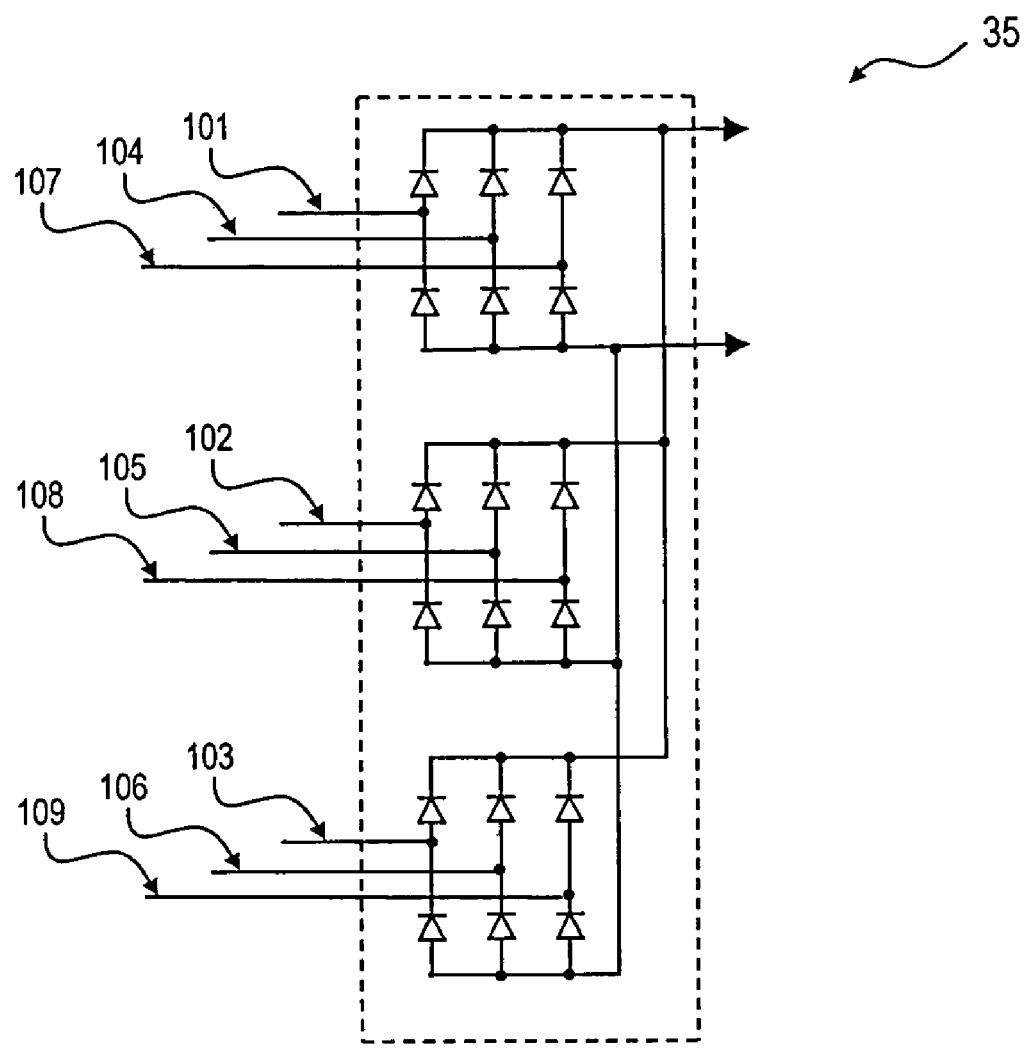
FIG. 5 is a schematic illustrating an example of a connection circuit for the rectifier device of FIG. 1.

As illustrated by the vector-block diagram 30 shown in FIG. 2 and the connection circuit 34 shown in FIG. 4, the autotransformer 15 of the present invention is constructed as a wye transformer circuit having at least one inner delta circuit 20 which serves as a common connection for each input terminal. Three input terminals 11, 12 and 13 are provided as three phase taps (e.g. phase A, B and C, respectively) for the primary side of the autotransformer 15, and can be connected to a three phase power distribution system as shown and described in FIGS. 1 and 4. Nine output terminals 101 through 109 are provided as taps for the secondary side of the autotransformer 15, and can be connected to a rectifier device as shown and described in FIGS. 1 and 5. FIG. 5 is a schematic illustrating an example of a connection circuit for the rectifier device of FIG. 1.

As shown in FIGS. 2 and 4, input terminal 11 is electrically coupled to output terminals 101, 102 and 103 via vector-blocks 201, 210 and 203 respectively. Input terminal 12 is electrically coupled to output terminals 104, 105 and 106 via vector-blocks 204, 211 and 206 respectively, and input terminal 13 is electrically coupled to output terminals 107, 108 and 109 via vector-blocks 207, 212 and 209 respectively. Additionally, output terminals 102, 105 and 108 are electrically coupled to the inner delta winding circuit 20 via vector-blocks 213, 214 and 215 respectively.

The inner delta circuit 20 of the autotransformer 15 of FIG. 2 further includes at least six vector-blocks 217a, 217b, 218b, 218c, 216a and 216c, electrically coupled in series forming a closed loop delta circuit within the wye transformer circuit described above. Vector-block 213 is electrically coupled to the inner delta winding circuit 20 between vector-blocks 218c and 216c. Vector-block 214 is electrically coupled to the inner delta winding circuit 20 between vector-blocks 216a and 217a, and vector-block 215 is electrically coupled to the inner delta winding circuit 20 between vector-blocks 217b and 218b.

Figure 3:
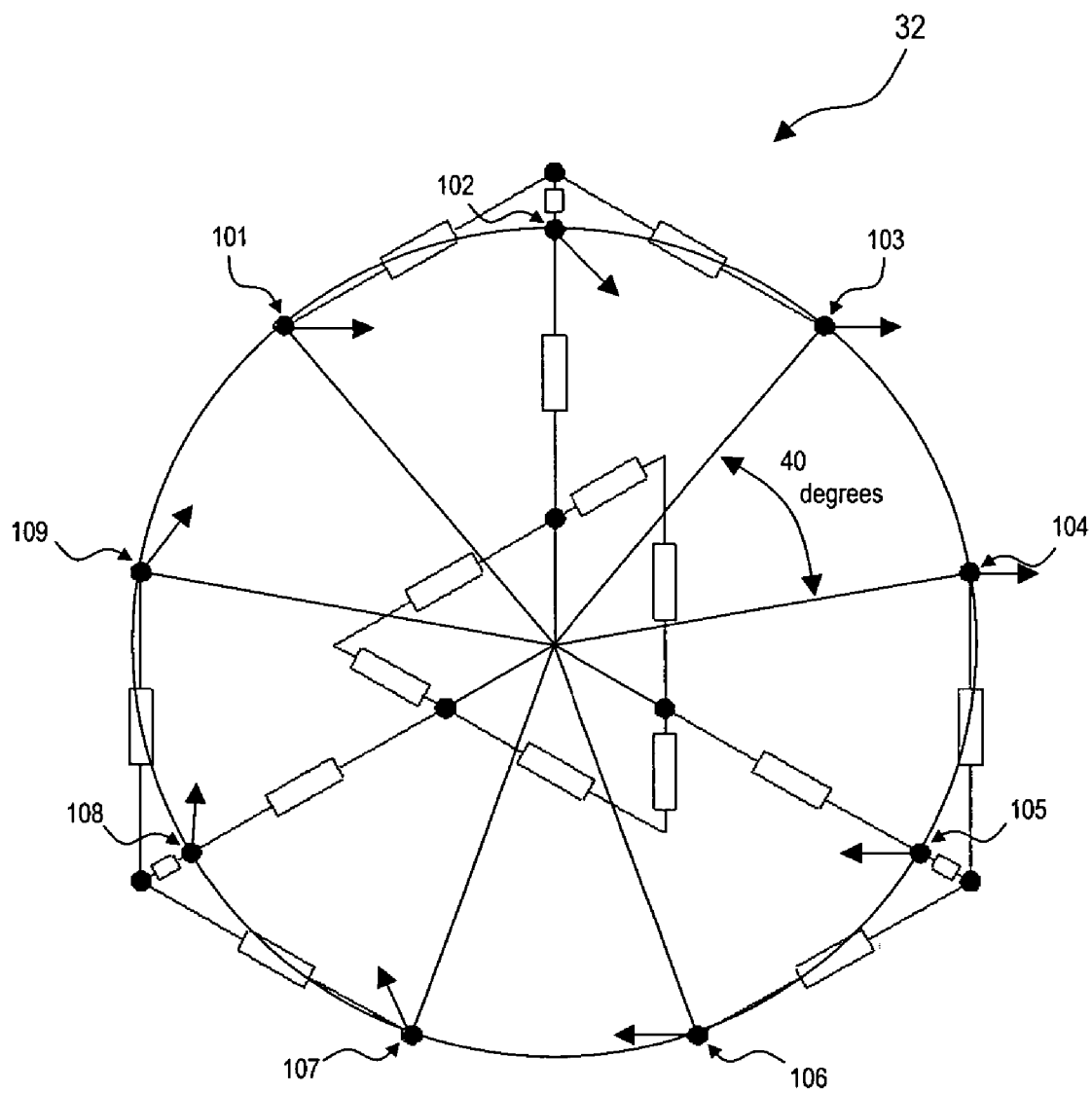
FIG. 3 is a vector diagram illustrating the output secondary voltage phase separation of the winding circuit configuration of FIG. 2.

The vector-blocks of FIG. 2 represent a per unit voltage vector which is proportional to the turns ratio presented by a transformer electrical winding configuration as more clearly shown in FIG. 4, and results in a voltage, or voltage vector value at each output terminal 101 through 109 that is configured to achieve a substantially 40 electrical degree phase shift separation from each subsequent output terminal as shown in FIG. 3. FIG. 3 is a vector diagram illustrating the output voltage phase separation at each output terminal 101 through 109 for the winding circuit configuration of FIG. 2. This is illustrated by over-laying a coordinate map shown in dashed lines over the winding circuit configuration of FIG. 2, and illustrating the electrical separation of individual outputs provided by the configuration.

Figure 6:
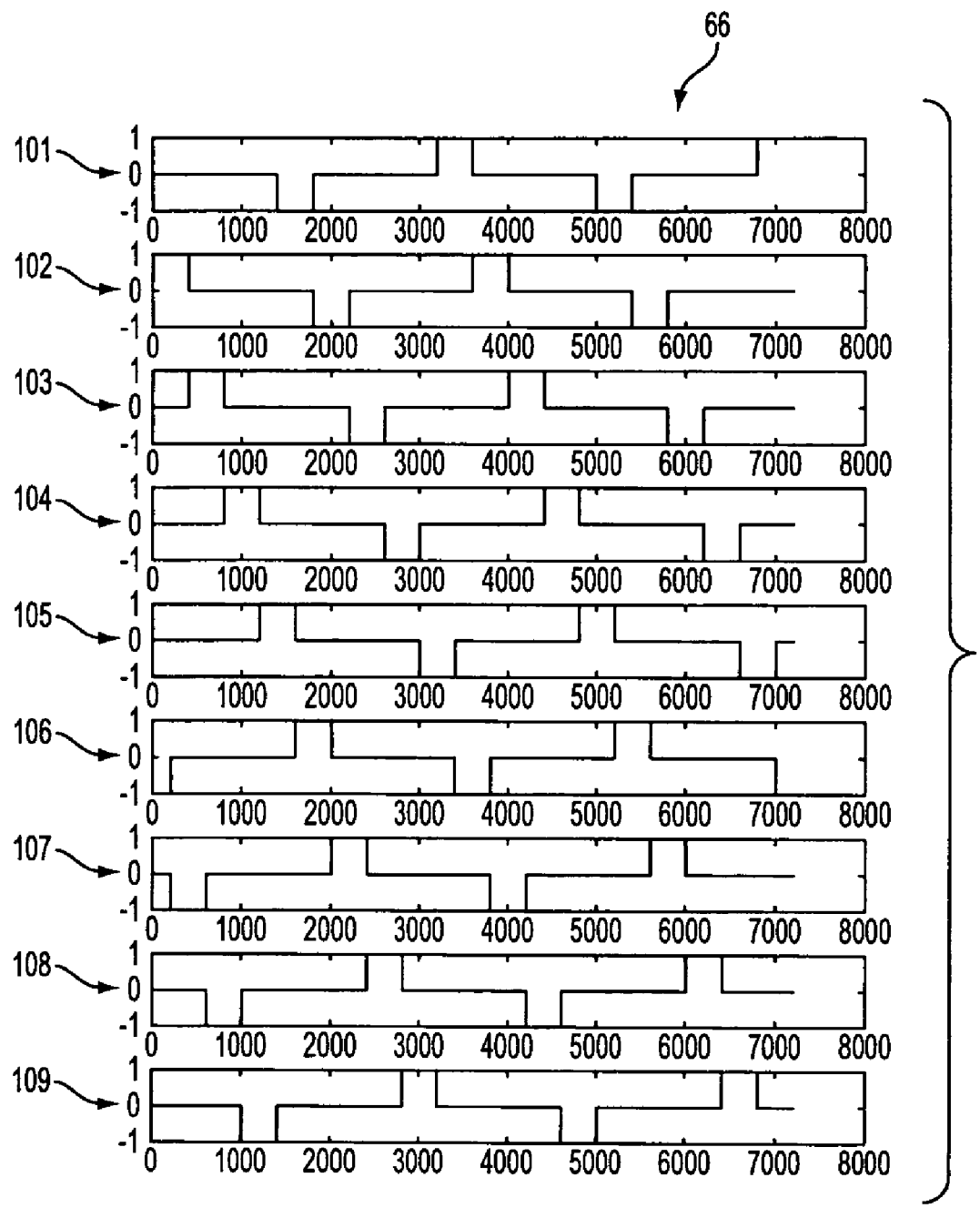
FIG. 6 is a series of plots illustrating an example of the secondary winding circuit output current values (pu) of the winding circuit configuration of FIG. 2.

As noted above for FIG. 1, the rectifier device 35 can be constructed in a multibridge configuration where output terminals 101 through 109 of the autotransformer 15 can be connected to the mid-point connection of each diode pair, respectively, as more clearly shown in FIG. 5. Each diode of the rectifier device 35 will have a finite forward conduction period wherein the conduction period of each secondary output is substantially 40 electrical degrees, which can be approximated to be rectangular as shown in FIG. 6 where the ac inductance is assumed to be zero. FIG. 6 is a series of plots 66 illustrating an example of the secondary winding circuit output current values (e.g. on and off periods) for each output terminal 101 through 109 of the embodiment described above, in which a conduction period for each output terminal 101 through 109 is shown. The dc current ($I_{dc}$) provided by the rectifier device 35 can be approximated to be a constant value (1 per unit) for calculation purposes due to a sufficient dc link inductance and a constant load.

Figure 7:
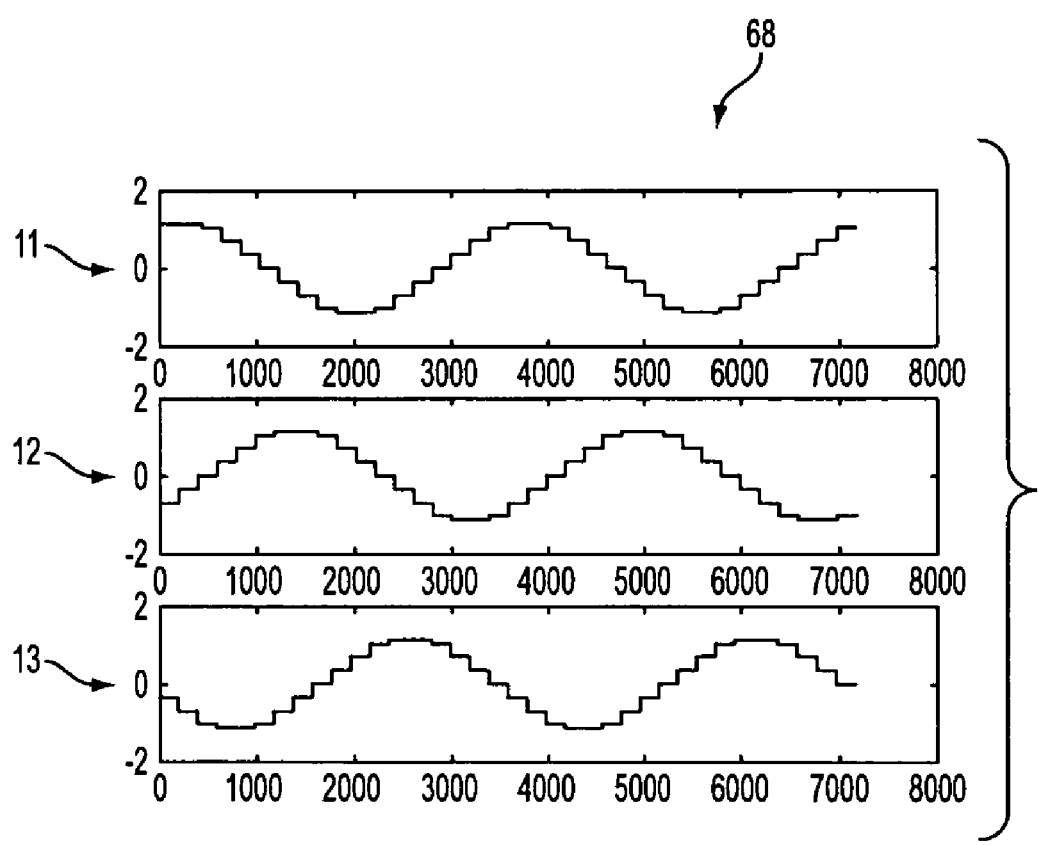
FIG. 7 is a series of plots illustrating an example of the primary input phase current values of the winding circuit configuration of FIG. 2.

In a practical application however, the current can not be changed instantaneously due to the finite ac inductance of each winding and therefore, the current waveform will have a finite first order slope during the transitions between conduction periods at the output terminals 101 through 109 of the autotransformer 15. For this reason, the primary side phase currents measured at input terminals 11, 12 and 13, and plots of which are shown in FIG. 7, will have a smooth waveform lowering the overall THD, yet the waveforms are still subjected to distortion due to harmonics. However, as shown in the calculations below, the inner delta winding circuit 20 described above, serves to minimize this effect.

For the illustrative calculations presented below, the magnitude of the primary winding line to neutral voltage vector is set to a value of one power unit (p.u.) in a normalized system, and the remaining voltage vector magnitudes of each winding can be determined as a percentage of this value. For windings excluding the inner delta circuit windings, the voltage vectors are reflected as a fixed value. For a balanced load in the autotransformer 15 of FIG. 2, the voltage vectors of vector-blocks 201, 203, 204, 206, 207 and 209 will be equal, and the voltage vectors of vector-blocks 210, 211 and 212 will be equal, as confirmed by the scale of the vector-blocks of FIG. 2 and equations (3) and (4) below, wherein N represents a per unit voltage vector value established by the winding and corresponding to the turns ratio of the vector block.

$$N_{201}=N_{203}=N_{204}=N_{206}=N_{207}=N_{209}=0.65270 \text{ p.u. fixed value} \quad (3)$$

$$N_{210}=N_{211}=N_{212}=0.12061 \text{ p.u. fixed value} \quad (4)$$

For the inner delta circuit 20, the voltage vectors are reflected as a variable ratio. For a balanced load in the autotransformer 15 of FIG. 2, the voltage vectors of vector-blocks 213, 214 and 215 will be equal, the voltage vectors of 216c, 217a and 218b will be equal, and the voltage vectors of 218c, 216a and 217b will be equal as confirmed by the scale of the vector-blocks of FIG. 2 and equations (5), (6) and (7) below, wherein N represents a per unit voltage vector value established by the winding and corresponding to the turns ratio of the vector block.

$$N_{213}=N_{214}=N_{215}=0.61272 \text{ p.u. variable ratio} \quad (5)$$

$$N_{216c}=N_{217a}=N_{218b}=0.26667 \text{ p.u. variable ratio} \quad (6)$$

$$N_{218c}=N_{216a}=N_{217b}=0.5333 \text{ p.u. variable ratio} \quad (7)$$

Furthermore, the ratio of voltage vectors of vector-blocks 216c/216a, 217a/217b, and 218b/218c will be equal as shown in equation (8) below.

$$N_{216c}/N_{216a}=N_{217a}/N_{217b}=N_{218b}/N_{218c}=0.5 \quad (8)$$

The variable ratio of the voltage vector values above for the inner delta circuit 20 shown in equations (6) and (7), result in part from a variable turn ratio for each winding that is a function of the chosen size of each inner delta circuit voltage vector. For example, an inner delta circuit 20 can be constructed where the rms value of the delta circuit current can be made to be approximately equal to the rms currents input to the delta circuit 20 from the wye circuit. That is, the current of vector-blocks 216, 217 and 218 can be made equal to the current of blocks 213, 214 and 215, as shown below in equation (9).

$$[I_{216}=I_{217}=I_{128}]=[I_{213}=I_{214}=I_{215}] \quad (9)$$

In the present invention, the magnitude of each voltage vector of the autotransformer 15 is directly proportional to the number of turns in the vector-block, or winding. Due to the integer number of turns required for the autotransformer in a practical design, the exact turns ratios will be approximate and there will be some finite error unless a common denominator can be found to achieve perfect turns ratios.

The voltage vectors that form the delta configuration, illustrated by vector-blocks 216c, 216a, 217a, 217b, 218b and 218c, can be made larger or smaller per given input voltage, however, several factors should be considered in constructing the inner delta circuit configuration. If the voltage vectors which result from the delta windings are kept large, the turns ratio of these windings would be larger and the rms current in the delta windings would be smaller. In determining the size of the delta winding, a smaller winding results in less voltage but higher current rms values, and a larger winding results in more voltage but less rms current.

The turns ratio of the inner delta circuit 20 can also be used to modify, or tune the inductance of the autotransformer of FIG. 2. The turns ratio may be used to achieve an rms rating of the current in the inner delta circuit 20 similar to or substantially the same as the rms rating of the current in the wye circuit as described above. This allows a common cross sectional area of the copper winding to be used in the manufacturing of the autotransformer.

Additionally, bucking and boosting of the resulting dc voltage can be achieved by further scaling the winding connections of the autotransformer embodiment shown in FIG. 2. However, changing the size of the voltage vectors which form the delta configuration does not significantly change the equivalent kVA of the autotransformer of the present invention, which can allow the manufacture of the embodiments of the present invention described herein using the same wire size for each winding or application (e.g. bucking or boosting).

Figure 12:
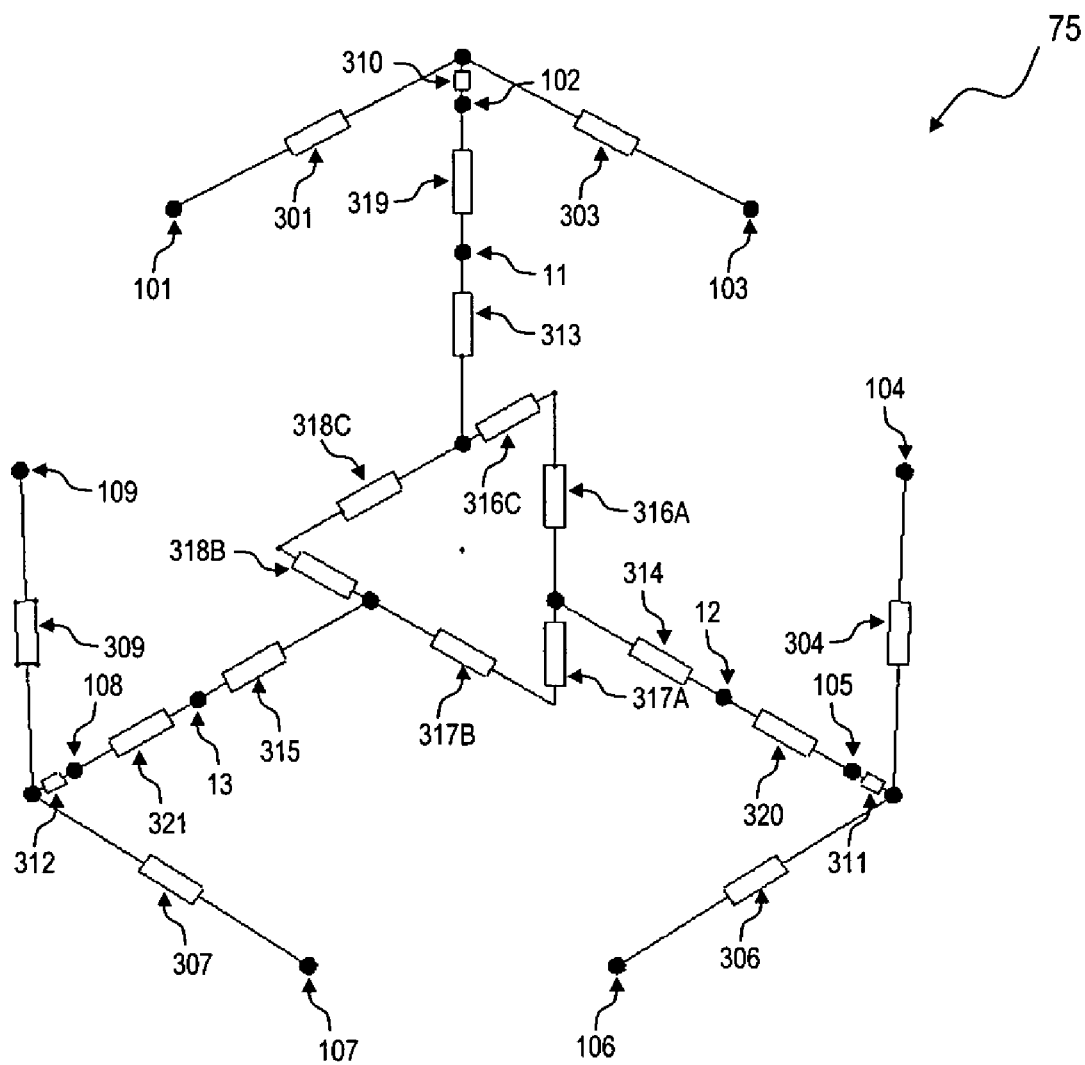
FIG. 12 is a vector-block diagram illustrating an example of a winding circuit configuration for a boosting autotransformer applied in FIG. 1 and operating in accordance with an embodiment of the present invention.

For example, a vector-block diagram illustrating a boosting autotransformer configuration in accordance with the present invention is shown in FIG. 12. As with FIG. 2, the vector-block diagram 75 of FIG. 12 illustrates each primary and secondary winding and winding connection of an example autotransformer wherein each winding is illustrated as a vector-block electrically coupled and scaled relative to remaining vector-blocks with respect to the turns ratio, inductance and resistance of each, and corresponding to the voltage vector value for the individual winding. As with FIG. 2, the autotransformer 75 of FIG. 12 includes at least 6 windings per phase A, B and C, including an inner delta circuit which is comprised in part of windings from phase A, B and C, and is provided to carry both triplen harmonics and a portion of fundamental current between phases A, B and C to reduce the harmonic current effect on input current waveforms as discussed above. Also, as in FIG. 2, in FIG. 12 terminals 11, 12, and 13 are for primary voltage inputs and 101 through 109 are for secondary voltage outputs.

In the configuration of FIG. 12, the output voltages of the secondary windings are set to a higher voltage compared to those of the configuration shown in FIG. 2. In doing so, either vector-blocks 310, 311 or 312, or vector-blocks 313, 314 or 315, can be further partitioned, or divided to insert the primary winding terminals to set the desired magnitude of the boosting of the secondary voltages. For example, as can be seen from FIG. 12 the number of turns of the vector-block 213 of FIG. 2 is partitioned into two sets of windings in the boosting autotransformer of FIG. 12 and shown as vector-blocks 313 and 319. This is repeated for each phase.

In FIG. 12, the voltage vectors of vector-blocks 301, 303, 304, 306, 307 and 309 will be equal, and the voltage vectors of vector-blocks 310, 311 and 312 will be equal as confirmed by the scale of the vector-blocks of FIG. 12 and equations (10) and (11) below, wherein N represents a voltage vector value established by the winding and corresponding to the turns ratio of the vector block.

$$N_{301}=N_{303}=N_{304}=N_{306}=N_{307}=N_{309}=0.65270 \text{ p.u. fixed value} \quad (10)$$

$$N_{310}=N_{311}=N_{312}=0.12061 \text{ p.u. fixed value} \quad (11)$$

For the inner delta circuit, the voltage vectors are reflected as a variable ratio. For a balanced load in the autotransformer of FIG. 12, the voltage vectors of vector-blocks 313, 314, 315 will be equal, 319, 320 and 321 will be equal, 316c, 317a and 318b will be equal, and 318c, 316a and 317b will be equal, as confirmed by the scale of the vector-blocks of FIG. 12 and equations (12), (13), (14) and (15) below, wherein N represents a voltage vector value established by the winding and corresponding to the turns ratio of the vector block. Although in the example shown below the voltage vectors of each group are equal, the voltage vectors of equations (14) and (15) are in fact variable, and voltage vectors of equations (12), (13), (16) and (17) are in fact adjustable for boosting to maintain a 40 degree separation.

If, in the embodiment shown in FIG. 12, the input line-neutral voltage is 1 p.u., the following ratio examples of equations (12) through (17) can be used to achieve boosting performance and keep the required 40 degree phase separation among the secondary winding outputs.

$$N_{313}=N_{314}=N_{315}=0.646 \text{ adjustable for boosting} \quad (12)$$

$$N_{319}=N_{320}=N_{321}=0.496 \text{ p.u. adjustable for boosting} \quad (13)$$

$$N_{316c}=N_{317a}=N_{318b}=0.353 \text{ p.u. variable ratio} \quad (14)$$

$$N_{318c}=N_{316a}=N_{317b}=0.706 \text{ p.u. variable ratio} \quad (15)$$

$$N_{310}=N_{311}=N_{312}=0.16 \text{ adjustable for boosting} \quad (16)$$

$$N_{301}=N_{303}=N_{304}=N_{306}=N_{307}=N_{309}=1.088 \text{ adjustable for boosting} \quad (17)$$

Furthermore, the ratio of voltage vectors of vector-blocks 316c/316a, 317a/317b, and 318b/318c will be equal as shown in equation (18) below.

$$N_{316c}/N_{316a}=N_{317a}/N_{317b}=N_{318b}/N_{318c}=0.5 \quad (18)$$

Figure 13:
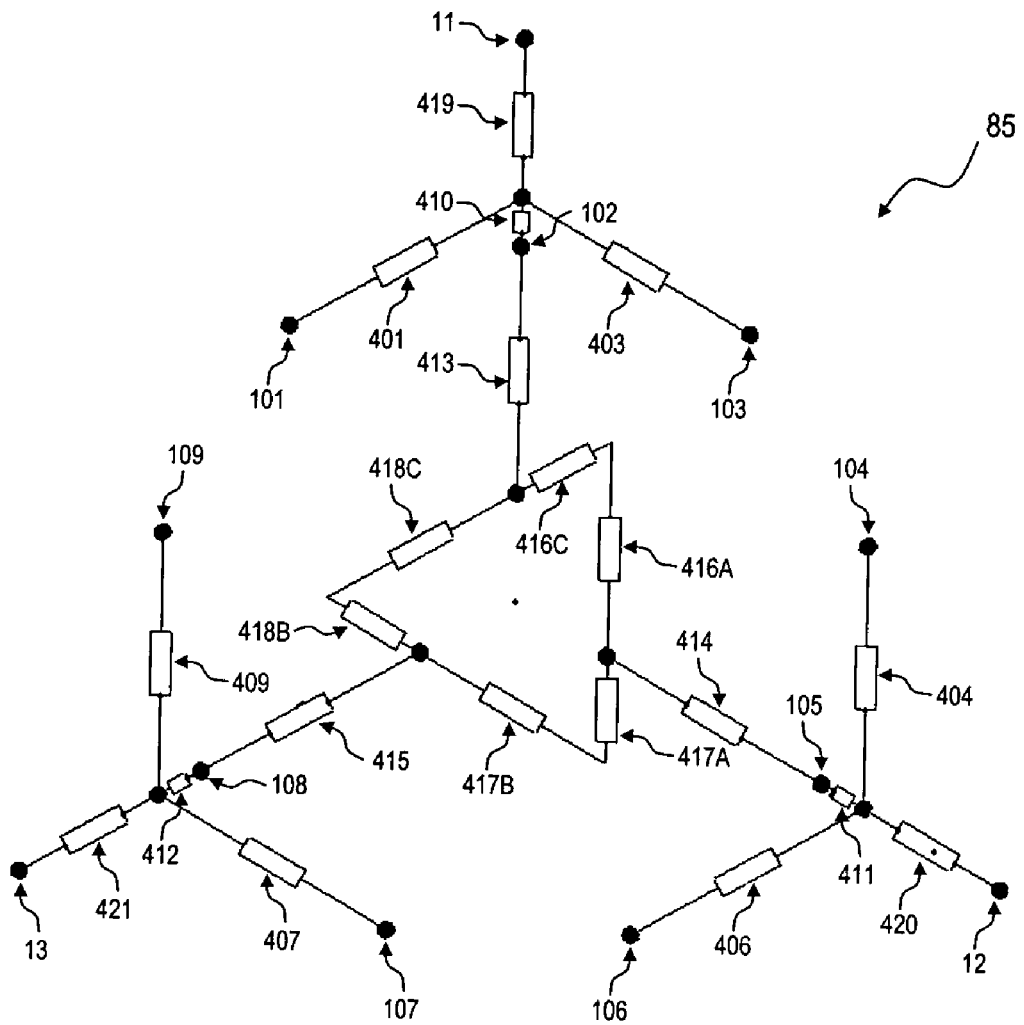
FIG. 13 is a vector-block diagram illustrating an example of a winding circuit configuration for a bucking autotransformer applied in FIG. 1 and operating in accordance with an embodiment of the present invention.

In yet another embodiment, a vector-block diagram illustrating a bucking autotransformer configuration in accordance with the present invention is shown in FIG. 13. As with FIGS. 2 and 12, the vector-block diagram 85 of FIG. 13 illustrates each primary and secondary winding and winding connection of an example autotransformer, wherein each winding is illustrated as a vector-block electrically coupled and scaled relative to remaining vector-blocks with respect to the turns ratio and corresponding to the voltage vector value for the individual winding. In the configuration of FIG. 13, the output voltages of the secondary windings are set to a lower voltage compared to those of the configuration of FIG. 2. For example, the numbers of turns of the windings of vector-blocks 419, 420 and 421 can be adjusted to set the desired magnitude of the bucking of the secondary voltages and are determined in a manner similar to that described in equations (10) through (18) for FIG. 12. As noted above for FIG. 12, in FIG. 13 terminals 11, 12, and 13 are for primary voltage inputs and terminals 101 through 109 are for secondary voltage outputs, wherein the voltage vectors can be varied to adjust the bucking to maintain 40 degree phase separation.

In addition to the examples shown in FIGS. 12 and 13, still other ratios can be implemented in equations (10) through (18) to achieve other bucking and boosting values wherein the overall winding configuration of the embodiment of the present invention remains intact. Specifically, the vector blocks can be further configured to satisfy the phase separation and achieve a bucking or boosting by implementing the inner delta winding to achieve the benefits outlined and described in greater detail below.

Returning to FIG. 2, the length of the voltage vectors illustrated by vector-blocks 201, 203, 204, 206, 207, 209, 210, 211 and 212 are constant for any given input voltage as shown in equations (3) and (4) above, and voltage vectors illustrated by vector-blocks 213, 214, 215, 216c, 216a, 217a, 217b, 218b and 218c can be varied to the extent described above. The nine secondary output terminal values resulting from these windings can be reflected on a circle connecting points 101 through 109 of FIG. 2 as shown in FIG. 3, with the voltage vector of each output substantially 40 electrical degrees apart from the preceding and subsequent voltage vector. The inner delta circuit 20 is comprised of variable voltage vectors which can be made larger or smaller per given input voltage, and serve to circulate the triplen harmonics produced by the rectification device between input phases. In doing so, the properly sized inner delta circuit 20 can significantly improve the kVA equivalence of the autotransformer 15 in FIGS. 2, 12 and 13 by minimizing the characteristic harmonics.

Figure 8:
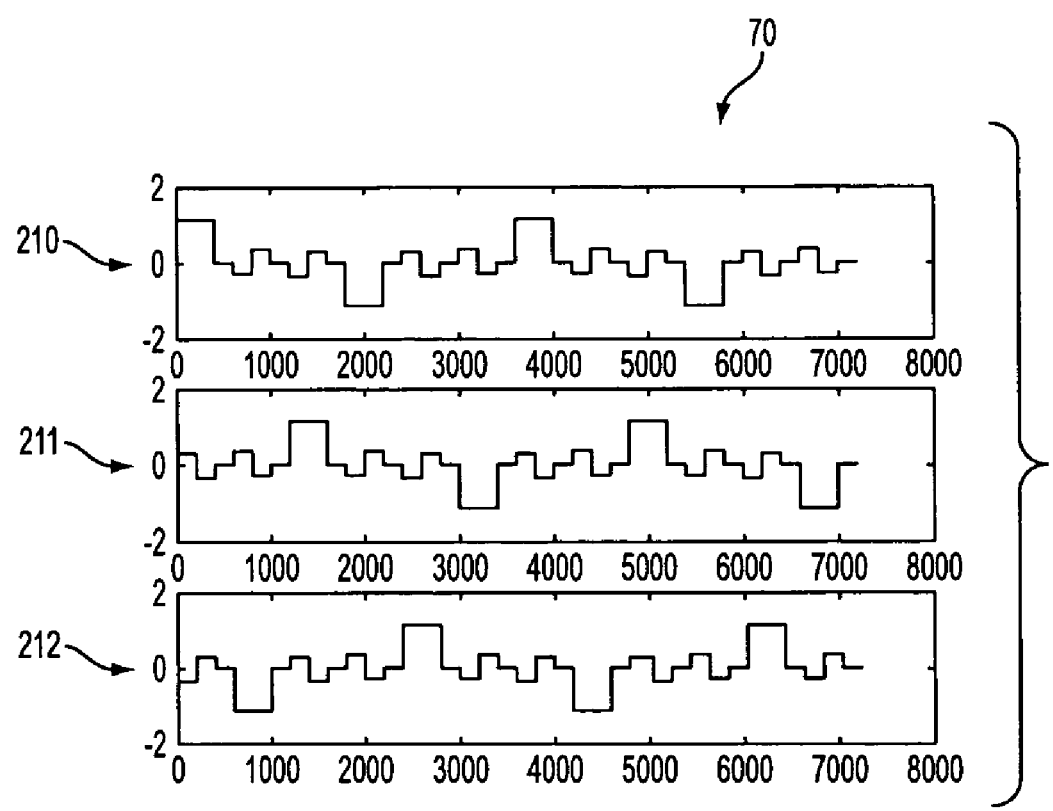
FIG. 8 is a series of plots illustrating an example of the winding currents provided to the inner delta winding circuit of the winding circuit configuration of FIG. 2.
Figure 9:
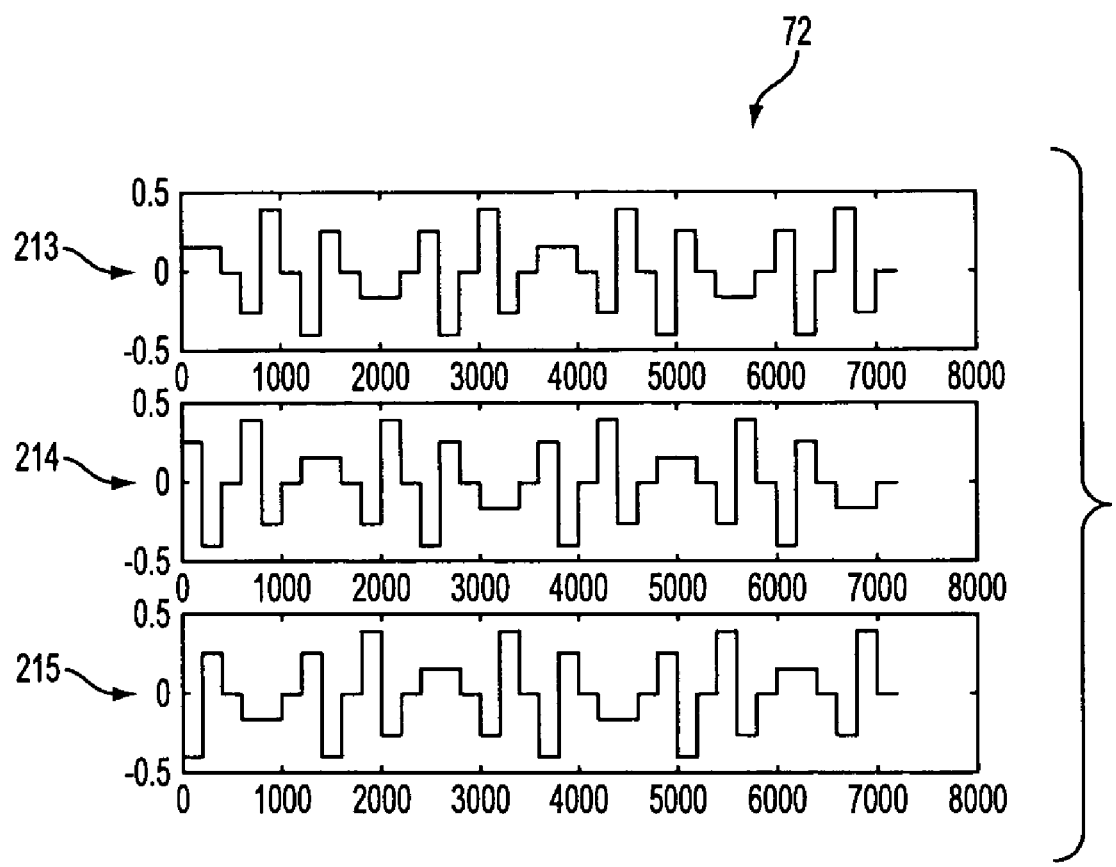
FIG. 9 is a series of plots illustrating an example of the winding currents provided to the inner delta winding circuit of the winding circuit configuration of FIG. 2.
Figure 10:
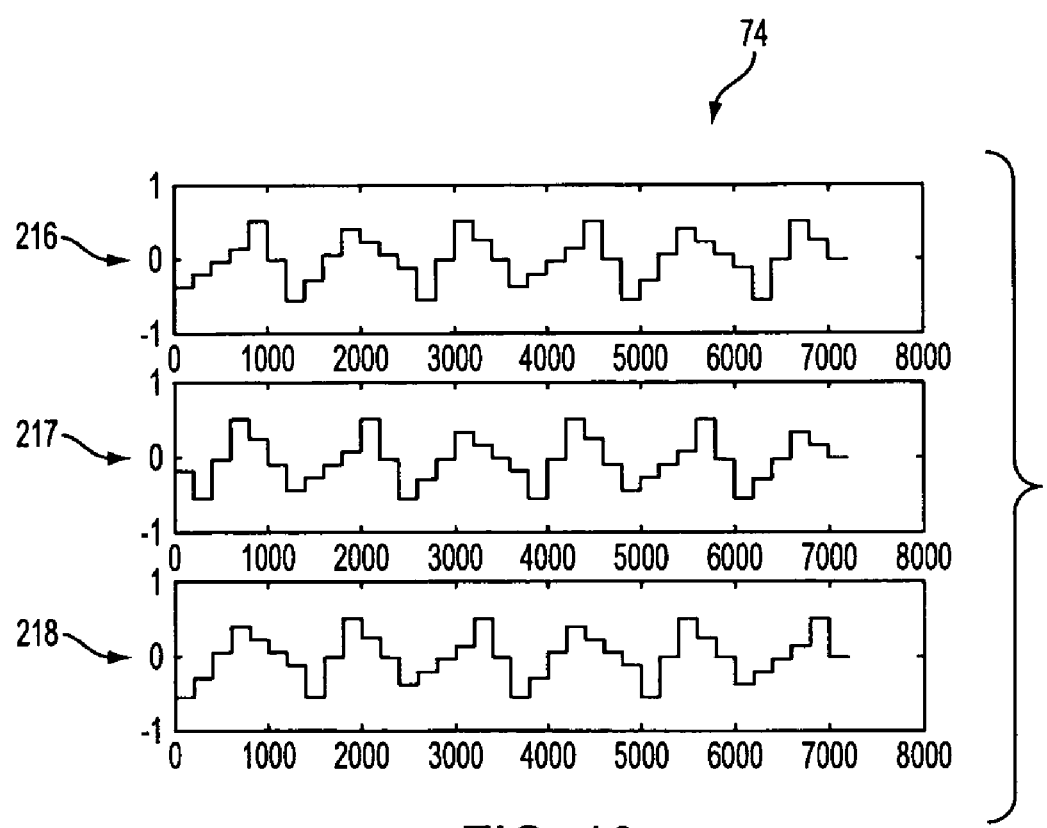
FIG. 10 is a series of plots illustrating an example of the winding currents within the inner delta winding circuit of the winding circuit configuration of FIG. 2.

To illustrate this improvement resulting from implementing the embodiment described above, an example calculation is presented below. For purposes of illustration, a three phase voltage can be coupled to the primary input terminals 11, 12 and 13 of the autotransformer 15 of FIG. 2, and a current in each vector-block or winding of the autotransformer can be obtained and an rms value calculated as shown in the resulting FIGS. 7 through 10. FIG. 7 is a series of plots 68 illustrating an example of the primary input phase current values of the winding circuit configuration of FIG. 2. FIGS. 8, 9 and 10 are a series of plots 70, 72 and 74 respectively, illustrating an example of the winding currents provided to and circulated by the inner delta winding circuit of the winding circuit configuration of FIG. 2.

For purposes of this example, it can be assumed that the peak of the secondary currents at output terminals 101 through 109 result in an $I_{dc}=1$ p.u. The rms current values for input terminal 11, or phase A, are noted below in equation (19) and examples are shown in plots 68 in FIG. 7, wherein $I_n$ represents the current present in the vector block n.

$$I_{11(rms)}=0.8165 \text{ p.u.}$$

$I_{210(rms)}$=0.5804 p.u.

$I_{201(rms)}$=$I_{203(rms)}$=0.4741 p.u.

$I_{213(rms)}$=0.2315 p.u.　(19)

The rms current values $I_{12(rms)}$ and $I_{13(rms)}$ can be calculated for input terminals 12 and 13 in a similar manner and examples are also shown in plots 68 in FIG. 7.

$I_{12(rms)}$=0.8165 p.u.

$I_{211(rms)}$=0.5804 p.u.

$I_{204(rms)}$=$I_{206(rms)}$=0.4741 p.u.

$I_{214(rms)}$=0.2315 p.u.　(20)

$I_{13(rms)}$=0.8165 p.u.

$I_{212(rms)}$=0.5804 p.u.

$I_{207(rms)}$=$I_{209(rms)}$=0.4741 p.u.

$I_{215(rms)}$=0.2315 p.u.　(21)

An example of a calculated rms current value $I_{210(rms)}$, $I_{211(rms)}$ and $I_{212(rms)}$ is illustrated in plots 70 in FIG. 8, and an example of a calculated rms current value $I_{213(rms)}$, $I_{214(rms)}$ and $I_{215(rms)}$ is illustrated in plots 72 in FIG. 9. The current value present in the inner delta circuit 20 can therefore be computed below in equation (22) and illustrated in plots 74 in FIG. 10 as rms current values $I_{216(rms)}$, $I_{218(rms)}$ and $I_{217(rms)}$, respectively.

$I_{216(rms)}$=0.2951 p.u.　(22)

where $I_{216(rms)}$=$I_{218(rms)}$=$I_{217(rms)}$.

Figure 11:
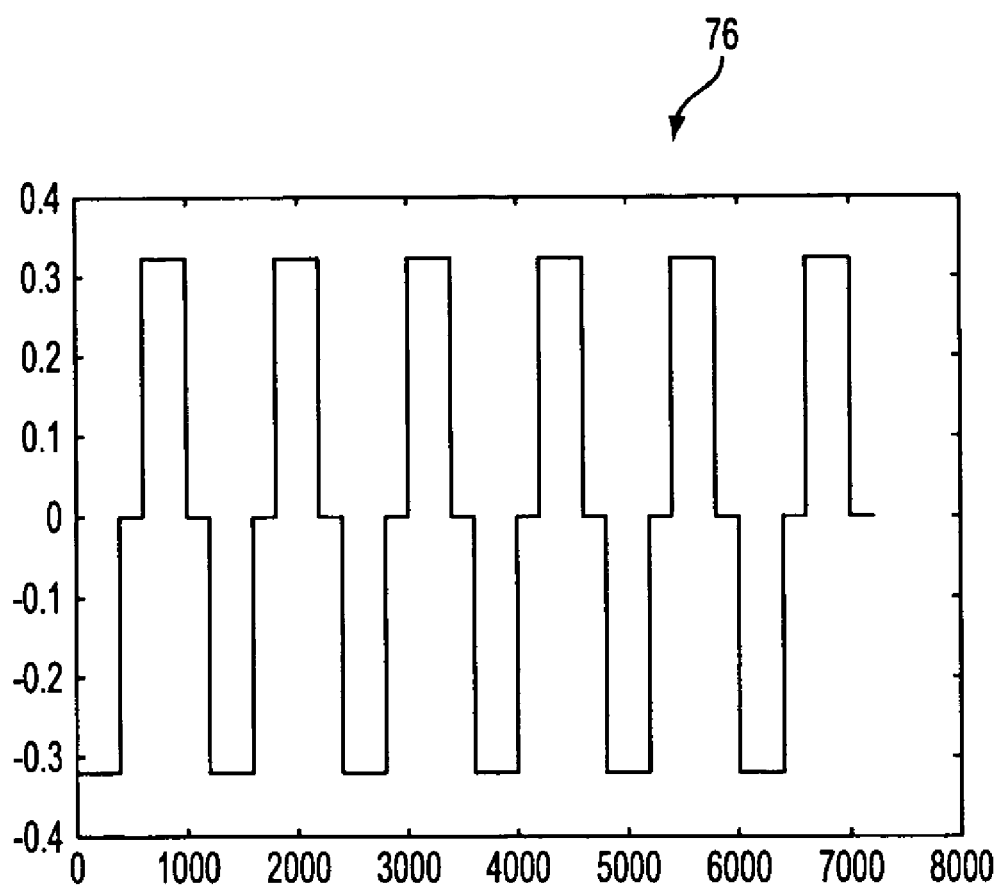
FIG. 11 is a plot illustrating an example of the triplen component of the inner delta winding circuit current illustrated in FIG. 10.

The triplen harmonic component of the current value present in the inner delta circuit 20 is computed below in equation (23) and illustrated in plot 76 in FIG. 11.

$I_{triplen(rms)}$=0.2631 p.u.　(23)

In order to achieve an 18-pulse rectification process where the $5^{th}$, $7^{th}$, $11^{th}$ and $13^{th}$ harmonics are eliminated and where the secondary currents conduct 40 degrees, the inner delta circuit 20 is needed for the circulation of triplens. Without such a delta circuit, the triplens can not be circulated.

The output dc link current provided by rectifier device 35 can be expressed in terms of incoming primary line-neutral voltage at terminals 11, 12 and 13 as provided by equation (24).

$V_{dc}$=2.44 $V_{line-neutral}$　(24)

The equivalent kVA rating of the autotransformer 15 can be calculated based on equation (25).

$$\text{Equivalent kVA} = 0.5 \times \frac{\Sigma V_{rms} I_{rms}}{1000} \quad (25)$$

where, $\Sigma V_{11(rms)} I_{11(rms)} = 3V_{201(rms)} I_{201(rms)} +$
$3V_{203(rms)} I_{203(rms)} +$
$3V_{210(rms)} I_{210(rms)} +$
$3V_{213(rms)} I_{213(rms)} +$
$3V_{216c(rms)} I_{216c(rms)} +$
$3V_{216a(rms)} I_{216a(rms)}$ and where, 3 $V_{201(rms)}$ $I_{201(rms)}$=3×0.65270×0.4098$V_{dc}$×0.4741$I_{dc}$ 3 $V_{203(rms)}$ $I_{203(rms)}$=3×0.65270×0.4098$V_{dc}$×0.4741$I_{dc}$ 3 $V_{210(rms)}$ $I_{210(rms)}$=3×0.12061×0.4098$V_{dc}$×0.5804$I_{dc}$ 3 $V_{213(rms)}$ $I_{213(rms)}$=3×0.61272×0.4098$V_{dc}$×0.2315$I_{dc}$ 3 $V_{216c(rms)}$ $I_{216c(rms)}$=3×0.26667×0.4098$V_{dc}$×0.295$I_{dc}$ 3 $V_{216a(rms)}$ $I_{216a(rms)}$=3×0.5333×0.4098$V_{dc}$×0.2951$I_{dc}$ For the embodiments described above, the resulting equivalent kVA of the autotransformer 15 is then found below using equation (26).

Equivalent kVA=0.6545 $V_{dc}I_{dc}$　(26)

An equivalent kVA typically found in the prior art can be calculated using the same method.

Equivalent kVA=0.6762 $V_{dc}I_{dc}$

The ratio of the equivalent kVA values of the prior art and the embodiment of the present invention described above is 0.968, which corresponds to an approximate savings of 3.2% in the equivalent kVA rating of the autotransformer. Such a smaller kVA rating would in turn result in savings in size, volume and cost, and better efficiency.

$$0.968 = \frac{\text{Equivalent kVA} = 0.6545 \ V_{dc}I_{dc}}{\text{Equivalent kVA} = 0.6762 \ V_{dc}I_{dc}}$$

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A harmonic circulating autotransformer, comprising:
  a primary side having a plurality of inputs, each input having at least six winding segments and each segment producing a voltage vector, each input electrically coupled at a point on said winding segments;
  an inner delta circuit, wherein at least one winding segment from each input is positioned in said inner delta circuit to provide at least one circulation path for triplen harmonic waveforms between inputs;
    wherein at least one winding segment from each input forms a circuit between at least one input and said inner delta circuit;
  a secondary side having a plurality of outputs, each output electrically coupled at a point on said winding segments; and
    wherein at least one winding segment from each input forms a circuit between each input and each output, said circuit separating each said output voltage vector by about 40 electrical degrees.

2. An autotransformer as claimed in claim 1, wherein each said winding segment is adapted to produce a voltage vector in proportion to a winding ratio.

3. An autotransformer as claimed in claim 2, wherein each input further comprises at least one winding segment that is adapted to produce a constant voltage vector relative to an input voltage.

4. An autotransformer as claimed in claim 2, wherein said inner delta circuit further comprises at least one winding segment that is adapted to produce a variable ratio voltage vector relative to an input voltage.

5. An autotransformer as claimed in claim 4, wherein said variable ratio voltage vector can be varied to control rms currents within said inner delta circuit.

6. An autotransformer as claimed in claim 5, wherein said control of said rms currents provide a reduction in harmonics circulated within said inner delta circuit.

7. An autotransformer as claimed in claim 1, wherein said plurality of outputs reduce an input voltage value.

8. An autotransformer as claimed in claim 1, wherein said plurality of outputs increase an input voltage value.

9. An autotransformer as claimed in claim 1, wherein said circulation path for triplen harmonic waveforms between inputs increases a total harmonic distortion of a voltage vector within at least one of an inner delta circuit winding segment.

10. An autotransformer as claimed in claim 1, wherein said circulation path for triplen harmonic waveforms between inputs decreases a total harmonic distortion of a voltage vector within at least one of an input winding segment.

11. A method for minimizing the effects of harmonics in an input phase current waveform using an autotransformer, the method comprising:
   coupling a plurality of inputs to a primary side input of an autotransformer, each primary side input having at least six winding segments and each segment producing a voltage vector;
   coupling each input of said plurality to an inner delta circuit via at least one winding segment from each input to provide at least one circulation path for triplen harmonic waveforms between inputs;
   coupling a load to a secondary side of said autotransformer, said secondary side having a plurality of outputs, wherein at least one winding segment from each input forms a circuit between each input and each output, said circuit separating each said output voltage vector by about 40 electrical degrees.

12. A method for minimizing the effects of harmonics in an input phase current waveform using an autotransformer as claimed in claim 11, further comprising producing a voltage vector in proportion to a winding ratio in each said winding segment.

13. A method for minimizing the effects of harmonics in an input phase current waveform using an autotransformer as claimed in claim 12, further comprising producing a constant voltage vector relative to an input voltage in an least one winding segment of said input.

14. A method for minimizing the effects of harmonics in an input phase current waveform using an autotransformer as claimed in claim 12, further comprising producing a variable ratio voltage vector relative to an input voltage in at least one winding segment of said inner delta circuit.

15. A method for minimizing the effects of harmonics in an input phase current waveform using an autotransformer as claimed in claim 14, further comprising varying said variable ratio voltage vector to control rms currents within said inner delta circuit.

16. A method for minimizing the effects of harmonics in an input phase current waveform using an autotransformer as claimed in claim 15, wherein said control of said rms currents provide a reduction in harmonics circulated within said inner delta circuit.

17. A method for minimizing the effects of harmonics in an input phase current waveform using an autotransformer as claimed in claim 11, further comprising stepping down an input voltage value.

18. A method for minimizing the effects of harmonics in an input phase current waveform using an autotransformer as claimed in claim 11, further comprising stepping up an input voltage value.

19. A method for minimizing the effects of harmonics in an input phase current waveform using an autotransformer as claimed in claim 11, wherein said circulation path for triplen harmonic waveforms between inputs increases a total harmonic distortion of a voltage vector within at least one of an inner delta circuit winding segment.

20. A method for minimizing the effects of harmonics in an input phase current waveform using an autotransformer as claimed in claim 11, wherein said circulation path for triplen harmonic waveforms between inputs decreases a total harmonic distortion of a voltage vector within at least one of an input winding segment.

* * * * *